3,438,266
ACCELEROMETER
Walter M. Carow, West Caldwell, and Herbert Rogall, Maplewood, N.J., assignors to Singer-General Precision, Inc., a corporation of Delaware
Filed Oct. 22, 1965, Ser. No. 501,934
Int. Cl. G01p 15/00
U.S. Cl. 73—516           11 Claims

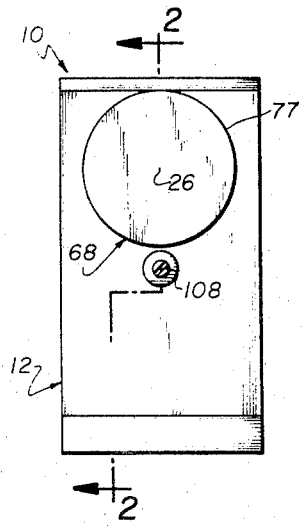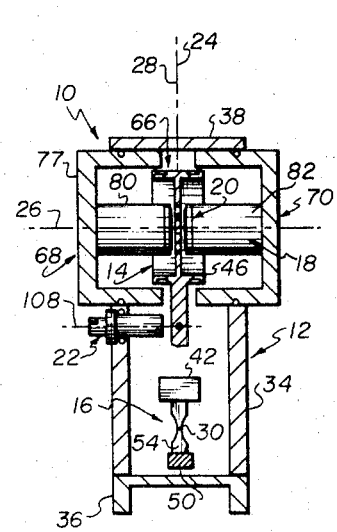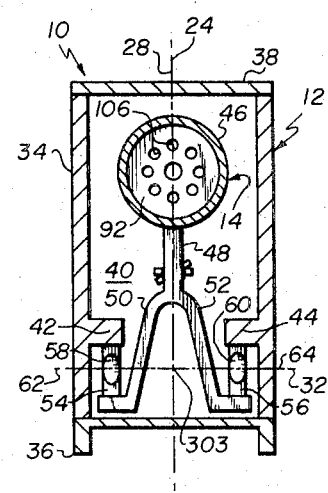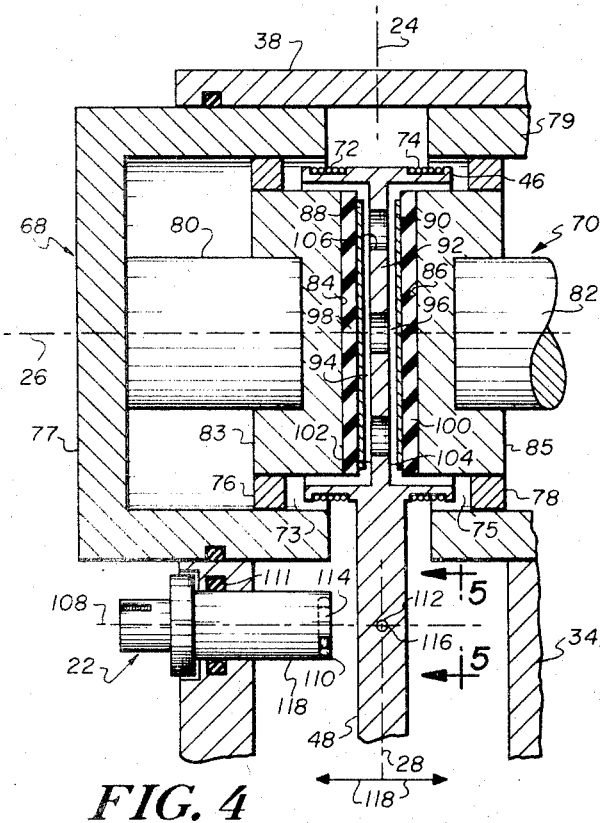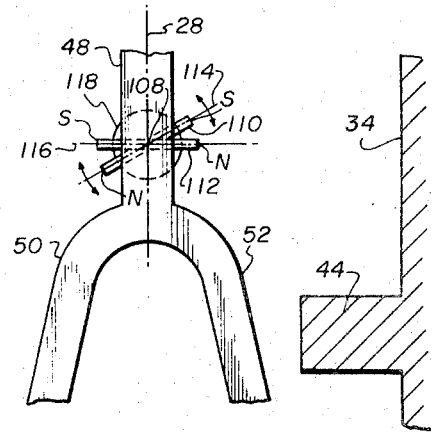
INVENTORS:
WALTER M. CAROW
HERBERT ROGALL
BY
ATTORNEY United States Patent Office 3,438,266
Patented Apr. 15, 1969

ABSTRACT OF THE DISCLOSURE

A housing filled with damping fluid has mounted therein a proof mass supported for pendulous movement about an axis normal to the accelerometer's sensitive axis. The proof mass has a pair of torquer coils wound thereon and by virtue of its pendulous mounting is displaceable between a corresponding pair of torquer magnet assemblies fixed to the housing. A capacitive pickoff unit is provided comprising a pair of capacitor end plates each of which is coaxially affixed to a corresponding magnet assembly along the sensitive axis. The proof mass design features a relatively thin, web-like member for movement between the capacitor end plates. A vernier torquer is also provided for positioning this web member at a null position between the capacitor end plates before start-up.

---

The present invention relates to pendulous accelerometers, and particularly to a single-axis pendulous accelerometer which has a capacitive pickoff.

A conventional pendulous accelerometer is fully described in U.S. Patent No. 3,132,521, which is assigned to the same assignee as in this invention. Said conventional pendulous accelerometer includes a pendulum having a proof mass at one end thereof and having a pivot means disposed at the opposite end thereof, a housing connecting to said pivot means, a torquer means having a torquer coil mounted on said proof mass and having a pair of cooperating torquer magnets mounted on said housing, and an inductive pickoff means having a pickoff primary coil mounted on said proof mass and having a pair of cooperating pickoff secondary coils mounted respectively on said torquer magnets.

One problem with said conventional pendulous accelerometer is that the inductive pickoff coils have a flux field, which interferes with the operation of the torquer coils that are disposed adjacent thereto. In some high performance installations, such interference is objectionable.

In accordance with one embodiment of the present invention, the aforementioned problem is avoided by using a capacitive pickoff means instead of an inductive coil-type pickoff means. In this way, interference with the operation of the torquer coils is eliminated.

Accordingly, it is one object of the invention to provide a pendulous accelerometer in which interference to the torquer caused by the pickoff is substantially eliminated.

It is another object of the invention to provide a pendulous accelerometer according to the aforementioned object, which has a very sensitive, easily-calibrated capacitive pickoff.

It is still another object of the invention to provide a pendulous accelerometer with a capacitive pickoff according to the aforementioned objects, in which temperature-induced error is minimized.

To the fulfillment of these and other objects, the invention provides an accelerometer comprising a pendulum, a housing, a torquer means and a capacitive pickoff means. The pendulum has a pendulous axis and has a proof mass disposed at one end thereof with a sensing axis disposed transverse thereto and has a pivot means disposed at the opposite end thereof with a pivot axis disposed transverse thereto. The housing connects to said pivot means for supporting said pendulum. The torquer has cooperating portions, which are respectively mounted on said proof mass and on said housing. The capacitive pickoff has cooperating portions, which are respectively mounted on said proof mass and on said housing.

Other objects of the invention will become apparent upon reading the following description and the accompanying drawings, wherein like parts are designated by like numerals throughout the several views, and wherein:

FIG. 1 is an elevation view of an accelerometer embodying features of the present invention;

FIG. 2 is a sectional view taken along the line 2—2 of FIG. 1;

FIG. 3 is a sectional view taken along the line 3—3 of FIG. 2;

FIG. 4 is a detailed view of a portion of FIG. 2; and

FIG. 5 is a sectional view taken along line 5—5 of FIG. 4.

Referring to FIGS. 1 and 2, one embodiment of the present invention is a single-axis pendulous accelerometer 10.

Accelerometer 10 comprises a housing 12, a pendulum 14 and a pivot means 16, which interconnects pendulum 14 to housing 12 at one end thereof. Accelerometer 10 also has a torquer means 18 for aligning pendulum 14 and housing 12; and has a capacitive pickoff means 20 for sensing relative movement therebetween. Accelerometer 10 also has a vernier torquer means 22 for bias adjustment of pickoff 20 and for aligning pendulum 14 and housing 12.

Housing 12 has a vertical axis 24. Pendulum 14 has a sensing axis 26, which is disposed substantially at right angles to axis 24 in the plane of FIG. 2 at accelerometer null condition. Pendulum 14 also has a pendulous axis 28, which intersects axis 24 at a pivot point 30 that is disposed at the opposite end of axis 24. Pendulum 14 also has a pivot axis 32, which is disposed substantially at right angles to axes 24 and 28 in the plane of FIG. 3 and which extends through pivot point 30. Housing 12 is coaxial with pendulum 14 along sensing axis 26 at accelerometer null condition.

Housing 12 includes a peripheral cylindrical wall 34, which is symmetrically disposed about axis 24, and a pair of axially-spaced end walls 36, 38, which are sealingly joined to wall 34 and which together form a fluid-tight cavity 40 that contains damping fluid (not shown), such as silicone oil, wherein pendulum 14 is immersed. Wall 34 has a pair of oppositely-facing shoulders 42, 44, which extend in a radially-inward direction for supporting pendulum 14.

Pendulum 14, which is a Y-shaped body, includes a proof mass head portion 46, which has a hollow cylindrical shape, an intermediate body portion 48, and a pair of elongate leg portions 50, 52, which extend axially outwardly from body 48. Head 46, body 48 and legs 50, 52 are disposed symmetrically about axis 28; head 46 is also symmetrical about axis 26; and legs 50, 52 are axially spaced along axis 32. Pendulum 14 is normally disposed in an inverted position as shown in FIGS. 2 and 3 for increased sensitivity.

Pivot means 16 includes a pair of flexure bars 54, 56, which have respective necked-down center portions 58, 60 with respective hinge axes 62, 64 that are spaced along and are colinear with axis 32 and that are equi-distant either side of axis 28. Bars 54, 56 respectively connect legs 50, 52 to shoulders 42, 44. With this construction, bars 54, 56 provide a low-creep, low-hysteresis, substantially-frictionless spring suspension.

When the upper end of pendulum 14 is angularly displaced about pivot axis 32, a torquer unit 18 is provided to restore the free end of the pendulum to its null position. As shown in FIG. 4, the torquer unit includes a pair of D.C. torquer coils 72 and 74 mounted on proof mass 46 and a pair of magnet assemblies 68 and 70 mounted on housing 12. Magnet assemblies 68, 70 respectively comprise permanent-core portions 80, 82 cylindrical plate members 83, 85, and a pair of cupped end caps 77, 79. The plate members 83 and 85 are supported by a pair of annular ring members 76 and 78 which also serve as magnetic return paths for core members 80 and 82. The above construction provides a uniform high density flux field in annular air gaps 73 and 75 formed between the circumferential outer surface of plate members 83 and 85 and the circumferential inner surface of the tubular section of each of the end caps 77 and 79. Coils 72 and 74 are wound on opposite ends of proof mass cylinder 46, coaxially therewith along axis 26 so as to extend substantially into air gaps 73 and 75. The coils are insulated from mass cylinder 46 in a known manner. When coils 72, 74 are suitably energized they react respectively with the flux field across each corresponding air gap, 73, 75 to produce the desired restoring forces for pendulum 14.

In order to generate a signal indicative of the angular position of pendulum 14, a capacitive pickoff unit 20 is provided coaxial to torquer 18 along sensing axis 26. This pickoff unit in its preferred form comprises a differential capacitor including end plates 88, 90 and the center plate 92 of proof mass 46 which latter therefore is adapted for movement between the end plates in response to inertial forces or as will be explained more fully below in response to forces applied by vernier torquer 22.

Center plate 92 is disposed between end plates 88, 90 and forms a pair of capacitor gaps 94, 96 disposed respectively on either side of plate 92. End plates 88, 90 are fixedly connected to the inner faces 84, 86 of plates 83, 85 and are insulated therefrom by insulators 98, 100. Insulators 98, 100 are preferably made of temperature-resistant, highly-polished glass disks, or the like; and end plates 88, 90 are preferably made of aluminum films, or the like, which are deposited on disks 98, 100 by a vacuum evaporation process, or a like method of manufacture. Center plate 92 is a circular, uniform-thickness metal plate that is fixedly connected to cylinder 46 on the inner side thereof. Center plate 92 has substantially-parallel end faces 102, 104; and has a plurality of openings 106, which extend through plate 92 between faces 102, 104 and which are substantially parallel to sensing axis 26.

With this construction, the problem of a bending of plate 92 due to a high fluid pressure in the reduced-thickness gap 94 or 96 that is caused by a displacement of proof mass 46 is substantially avoided. In addition, the problem of restricted fluid flow between gap 94 and 96 during such displacement of proof mass 46 is also substantially avoided.

In accordance with the present invention, a vernier torquer 22 is provided for applying controllable forces to pendulum 14 along a force axis 108 disposed substantially at right angles to vertical axis 24 in the plane of FIG. 4. As best seen in FIGS. 4 and 5, vernier torquer 22 comprises a tubular control element 118 rotatably mounted in an O-ring 111 seated within wall 34 of housing 12. Fixedly secured to the right-most end of element 118 and in substantial proximity to the intermediate section 48 of pendulum 14 is a conventional permanent bar magnet 110 preferably in tubular form and having the usual North and South Magnetic Poles at either extremity thereof. Magnet 110 is supported in a suitable manner in the end portion of control element 118 such that its longitudinal axis 114 is normal to force axis 108 as shown in FIG. 5. A second permanent magnet 112 identical to magnet 110 is fixedly mounted within a suitable recess in intermediate member 48 of pendulum 14 so that its longitudinal axis 116 is normal to force axis 108 and parallel to longitudinal axis 114 when pendulum 14 is at a null position. In the operation of the vernier torquer, control element 118 may be rotated about axis 108 from a position external to housing 12 to rotate magnet 110 about this same axis accordingly. Depending upon their relative orientation, the force fields generated by magnets 110, 112 will interact to apply positive or negative torques to pendulum 14 along axis 108 thereby displacing the pendulum as indicated by arrows 118 (FIG. 4). That is, the direction and magnitude of the torque applied to the pendulum will vary in accordance with the relative angular orientation between longitudinal axes 114 and 116. It is thus seen that vernier torquer 22 is adapted to apply a limited range of positive and negative forces along axis 108 and against pendulum 14 before accelerometer start-up in order to counteract undesirable spring restraint moments in flexure bars 54, 56 and to make gaps 94, 96 substantially equal in width for calibration of capacitive pickoff 20.

In summary, this invention provides a pendulous accelerometer, in which interference to the torquer caused by the pickoff is substantially eliminated and which has a very sensitive, easily-calibrated capacitive pickoff in which temperature-induced errors are substantially minimized.

While the present invention has been described in a preferred embodiment, it will be obvious to those skilled in the art that various modifications can be made therein within the scope of the invention. It is intended that the appended claims cover all such modifications.

What is claimed is:
1. An accelerometer comprising:
  a pendulum with a pendulous axis having a proof mass disposed at one end thereof with a sensing axis disposed transverse thereto and having a pivot means disposed at the opposite end thereof with a pivot axis disposed transverse thereto;
  a housing connecting to said pivot means;
  torquer means with cooperating portions respectively mounted on said proof mass and on said housing;
  capacitive pickoff means with cooperating portions respectively mounted on said proof mass and on said housing; and
  vernier torquer means for applying a transverse force to said pendulum before start-up, said vernier torquer means including a first magnetic means fixedly mounted on said pendulum and a second magnetic means fixedly mounted on a control element, said control element being located in substantial proximity to said first magnetic means and being supported for rotation on said housing about an axis normal to said pivot axis and parallel to said sensing axis whereby the force acting on said pendulum resulting from the intersection between said first and second magnetic means varies with the rotation of said control element.

2. An accelerometer as claimed in claim 1,
in which said torquer has a torquer coil mounted on said proof mass and has a pair of torquer magnets mounted on said housing coaxially therewith and disposed on either side of said torquer coil, and
in which said capacitive pickoff has a pickoff center plate mounted on said proof mass coaxially therewith and has a pair of cooperating pickoff end plates mounted on said torquer magnets coaxially therewith on either side thereof forming a pair of capacitive gaps therebetween.

3. An accelerometer as claimed in claim 2,
in which said housing has a cavity containing damping fluid in which said pendulum is immersed, and
in which said pickoff center plate has a plurality of spaced passages extending therethrough for ease of fluid flow between said gaps.

4. An accelerometer as claimed in claim 2, in which the ratio of capacitive gap thickness to pendulum arm length does not exceed two percent, where said gap thickness is the nominal gap thickness at accelerometer null condition, and where said pendulum arm length is the distance from said sensing axis to said pivot axis.

5. An accelerometer as claimed in claim 2, in which said pivot means includes a pair of flexure bars with necked-down center portions having hinge axes respectively coaxial with each other along said pivot axis.

6. An accelerometer comprising:
an elongated pendulum with a proof mass at one end and with a pair of flexure hinges at its other end;
a housing connected to said hinges for supporting said pendulum and for permitting pendulous movement of said pendulum about a first axis common to said pair of hinges;
torquer means with cooperating portions mounted on said pendulum and on said housing;
pickoff means with cooperating portions mounted on said pendulum and on said housing; and
bias adjusting means including magnet portions mounted on said pendulum and on said housing respectively in a substantially juxtaposed manner for venier torquing of said pendulum relative to said housing prior to accelerometer start-up; said housing magnetic portion being adapted for rotation about a second axis normal to said first axis and substantially normal to said pendulum when the latter is in its null position whereby the vernier torque applied to said pendulum may be varied by rotating said housing magnet portion about said second axis.

7. An accelerometer as claimed in claim 6, in which said housing has a fluid-tight cavity containing damping fluid in which said pendulum is immersed in order to minimize pendulum dead weight for ease of bias adjustment of said pendulum at start up.

8. The accelerometer of claim 6 wherein:
said elongated pendulum is Y-shaped having a pair of transversely spaced leg portions at its other end, said leg portions being connected respectively to said pair of flexure hinges.

9. A single-axis accelerometer comprising:
a housing,
a pendulum,
a pivot means interconnecting said housing and said pendulum,
a torquer means for aligning said pendulum and said housing,
a capacitive pickoff means for sensing relative movement between said housing and said pendulum, and
a vernier bias-adjusting torquer means for bias adjustment of said pickoff and for aligning said housing and said pendulum,
said housing having a vertical axis,
said pendulum having a sensing axis disposed at right angles to said vertical axis at null condition, said pendulum also having a pendulous axis intersecting said vertical axis at a pivot point and having a pivot axis extending through said pivot point and disposed at right angles to a plane including said pendulous axis and said vertical axis,
said housing having a peripheral wall and a pair of axially-spaced end walls forming a cavity containing damping fluid in which said pendulum is immersed, said peripheral wall having a pair of inner shoulders,
said pendulum having a proof-mass head portion, an intermediate body portion and a pair of elongate leg portions,
said pivot means including a pair of flexure bars having necked-down center portions with respective hinge axes spaced along said pivot axis, said bars being fixedly connected to said shoulder portions,
said torquer having a torquer coil and a pair of magnets, said torquer coil having spaced end portions wound on said proof-mass portion, said torquer magnets having holders connected to opposite sides of said peripheral wall and having respective magnetic cores with inner end faces,
said capacitive pickoff having a pair of end plates and a movable center plate forming a pair of capacitive gaps therebetween, said end plates having insulators connecting to said core end faces respectively, said center plate having outer end faces adjacent said gaps and a plurality of openings extending between said end faces for flow of damping fluid therethrough, and
said vernier torquer including a first magnet mounted for rotation on said housing about an axis normal to said vertical axis and said pivot axis, and a second magnet fixedly secured to said pendulum intermediate body portion in substantial intersecting relation to the rotation axis corresponding to said first magnet.

10. An accelerometer comprising:
a support having a vertical axis,
a proof-mass adapted for pendulous movement relative to said support along a sensing axis normal to said vertical axis, and
torquer means for positioning said proof mass at the intersection of said vertical axis and said sensing axis,
said torquer means including a first bi-polar force generator mounted for rotation relative to said support about an axis parallel to said sensing axis and normal to said vertical axis and a second bi-polar force generator fixedly associated with said proof-mass, said first and second bi-polar force generators being spaced in sufficient proximity to one another to cause their corresponding force fields to interact whereby rotation of said first bi-polar force generator effects a variable reaction torque on said second bi-polar force generator and therefore said proof mass.

11. The accelerometer of claim 10 wherein:
said first and second bi-polar force elements each comprise permanent magnets having a North Magnetic Pole and a South Magnetic Pole.

References Cited

UNITED STATES PATENTS

| | | | |
|---|---|---|---|
| 2,888,256 | 5/1959 | Sedgfield | 73—517 |
| 2,985,021 | 5/1961 | Lewis et al. | 73—517 |
| 3,111,036 | 11/1963 | Kistler | 73—517 |
| 3,126,746 | 3/1964 | Blitzer et al. | 73—516 XR |
| 3,209,601 | 10/1965 | Stiles | 73—517 |
| 3,323,372 | 6/1967 | Kistler et al. | 73—517 |
| 3,331,253 | 7/1967 | Morris | 73—517 |

JAMES J. GILL, *Primary Examiner.*